Figure 1:
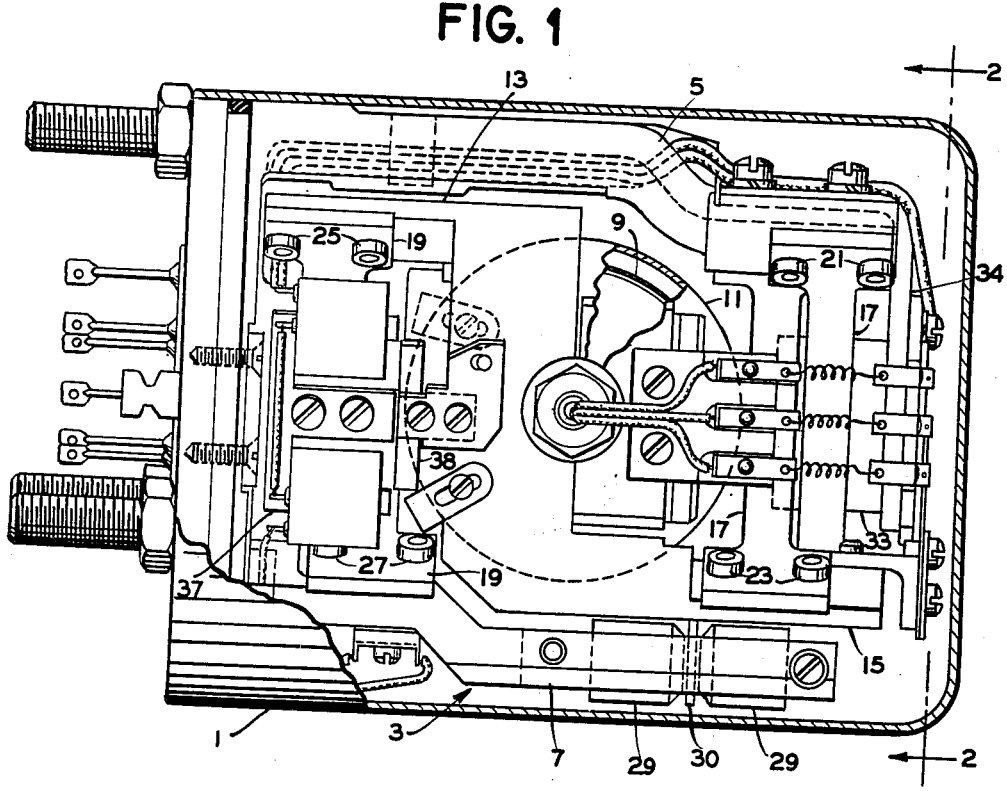

Aug. 31, 1954

H. KONET 2,687,648

ANGULAR RATE GYROSCOPE

Filed Oct. 21, 1949

INVENTOR.
HENRY KONET
BY
-ATTORNEY-

Patented Aug. 31, 1954

2,687,648

UNITED STATES PATENT OFFICE 2,687,648

ANGULAR RATE GYROSCOPE

Henry Konet, Hohokus, N. J., assignor to Bendix Aviation Corporation, Teterboro, N. J., a corporation of Delaware Application October 21, 1949, Serial No. 122,671

8 Claims. (Cl. 74—5.4)

The invention relates to gyroscopes, and more particularly to gyroscopes adapted to indicate rate of angular motion, such as rate of turn, of a craft on which the gyroscope is mounted.

An angular rate gyroscope has two degrees of freedom and includes a rotor rotatably supported in a casing mounted in a frame for limited pivotal movement about an axis normal to the spin axis of the rotor. One type of angular rate gyroscope used heretofore includes ball bearings for pivotally mounting the rotor casing in the frame, and coil tension springs for opposing precession of the gyroscope from neutral position. The bearings create objectionable friction which must be overcome by precessional forces of the gyroscope. Also, large acceleration forces react on the tension springs and the gyroscope may give erroneous readings.

To overcome objectionable friction of the bearings, another arrangement is shown and described in Reissue Patent No. 22,330, issued June 8, 1943, to C. S. Draper, in which the rotor casing, incorporating trunnions, is supported by springs secured at their midpoints to the rotor casing trunnions. The outer ends of the springs are secured to the frame and the portions of the springs between the trunnions and the frame are bent at right angles. This arrangement is subject to mechanical hysteresis, that is, the gyroscope does not accurately return to neutral position after precessing as a result of angular movement of the craft. The right angle bends increase the effective lengths of the springs to decrease unit stress and provide sufficient relative movement between the casing and frame, but with this arrangement, acceleration and vibration forces cause the casing to move upwardly and downwardly and laterally, and damping means to avoid such movement is required.

One object of the present invention is to suspend a gyroscope rotor casing in a frame by a relatively simple frictionless spring support, which provides maximum spring length and minimum unit stress to avoid hysteresis, and is rigid enough to withstand linear vibrations so that no vibration damping means is required.

Another object is to provide an angular rate gyroscope with a frictionless support which withstands large acceleration forces without damage or erroneous readings.

Another object is to provide a frictionless support for an angular rate gyroscope which provides for rotation of the rotor casing about the precession axis and avoids other movements of the casing relative to its support.

The invention contemplates an angular rate gyroscope having a rotor rotatable in a casing suspended by pairs of opposing springs for oscillation in a frame. The springs yieldingly oppose precession of the casing in either direction. The gyroscope may include relatively movable parts on the frame and rotor casing for indicating the relative movement of the frame and casing when the craft mounting the gyroscope changes direction.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

In the drawings, Figure 1 is a front view of an angular rate gyroscope constructed according to the invention, with portions of the housing and rotor casing cut away to more clearly show the construction.

Figure 2:
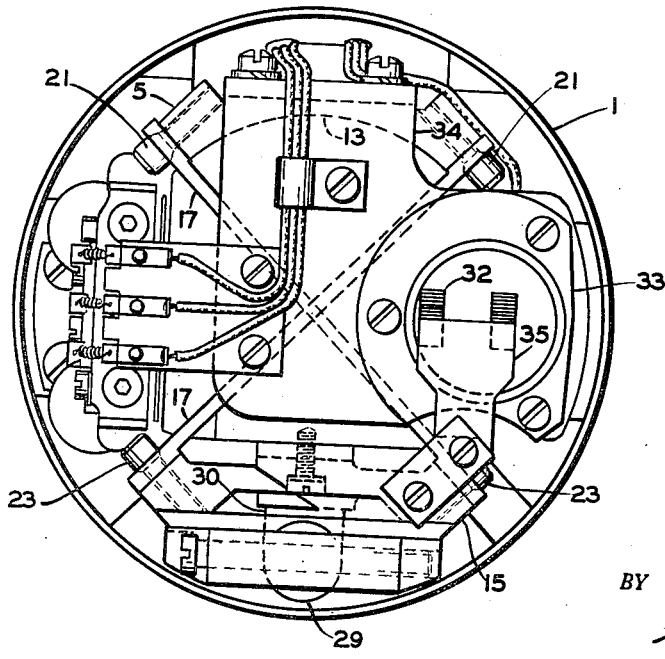

Figure 2 is a transverse vertical section taken approximately on the line 2—2 of Figure 1.

The angular rate gyroscope includes a housing 1 enclosing a substantially U-shaped frame 3 having an upper leg 5 and a lower leg 7. A rotor 9, driven electrically and having its spin axis disposed horizontally, is rotatably supported in a casing 11. Casing 11 has an upper horizontal arm 13 extending in one direction adjacent leg 5 and a lower horizontal arm 15 extending in the opposite direction adjacent leg 7.

The rotor casing is mounted for oscillation relative to the frame by a cruciform suspension including pairs of crossed substantially planar springs 17, 19, at the sides of the casing. Each spring 17 is attached at its upper end by screws 21 to leg 5 of frame 3 and at its lower end by screws 23 to arm 15 of rotor casing 11. Each spring 19 is connected at its upper end by screws 25 to arm 13 of rotor casing 11 and at its lower end by screws 27 to leg 7 of frame 3. A line extending between the points at which the pairs of springs cross one another is perpendicular to the rotor spin axis and passes through the axis of the casing and through its center of gravity.

The springs support the casing without friction from the frame and provide limited freedom therefor. By securing one end of each spring to the casing and the opposite end of each spring to the frame, with the intermediate portions of the spring free of engagement with the casing, the springs may flex and provide sufficient relative movement between the casing and frame even though the springs are relatively short. The precession movement of the gyroscope is substantially proportional to the rate of angular movement of the craft on which the gyroscope is mounted, even through relatively large angles of precession resulting from rapid angular rates.

A fixed magnet 29 is secured to lower leg 7 of frame 3 and cooperates with a vane 30 secured to arm 15 of casing 11 to damp oscillations of the gyroscope.

When the gyroscope is used in a craft, an oscillator (not shown) of any suitable kind may be used to provide audio frequency signals proportional to the rate of angular movement of the craft. When the craft is moving in a straight line, a predetermined frequency signal is generated by the oscillator, and the frequency of the signal increases or decreases as determined by the direction and rate of angular movement of the craft. The oscillator frequency may be changed by an inductive device including an inductance element 32 fixed within a container 33 secured to a bracket 34 attached to leg 5 of frame 3, and a plate-like element 35 secured to leg 15 of casing 11 and movable relative to and within the magnetic field of inductance element 32.

A phase voltage signal proportional to the rate of angular movement of the craft may be provided by a pickoff inductance device having a stator 37 secured to frame 3 and a member 38 movable relative to stator 37 and secured to casing 11. When the craft moves in a straight line, the voltage signal is zero. When the craft moves angularly in one direction, a voltage of one phase is generated, and when the craft moves angularly in the opposite direction, a voltage of opposite phase is generated.

The audio frequency and voltage signals generated by the oscillator and the pickoff inductance device, respectively, are substantially proportional to the rate of angular movement of the craft even for relatively large angles of gyroscope precession indicating a rapid angular rate.

The frictionless spring support provides for rotation of the rotor casing about the precession axis, and avoids other movements of the casing relative to the support. The support avoids mechanical hysteresis and is rigid enough to withstand acceleration forces and linear vibrations without providing separate damping means. The rotor casing is supported wholly by the spring support and no casing trunnions are required as in devices used heretofore.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. An angular rate gyroscope comprising a rotor support, a frame, crossed springs extending between said frame and said support and supporting said support for oscillation in said frame and yieldingly opposing precession of the support in either direction from its neutral position, said springs at their point of crossing being free of engagement of said support.

2. An angular rate gyroscope comprising a rotor, a support rotatably supporting said rotor, a frame, a plurality of crossed springs supporting said support for oscillation in said frame and yieldingly opposing precession of the support in either direction from its neutral position, said springs at their point of crossing being free of said support and being substantially aligned with the center of gravity of the support.

3. An angular rate gyroscope comprising a rotor support, a frame, and a pair of opposing springs at each side of said support mounting said support for oscillation in said frame and yieldingly opposing precession of the support in either direction from its neutral position, each of said springs being attached at one end to said support and at its other end to the frame.

4. An angular rate gyroscope comprising a rotor, a support rotatably supporting said rotor for spinning about an axis, a frame, and crossed springs mounting said support in said frame for precession about a second axis at an angle to said spin axis, each of said springs being secured at one end to said support and at the other end to said frame, said springs being free of the rotor support at the point at which said springs cross one another, and said point being aligned with the center of gravity of the rotor support.

5. An angular rate gyroscope comprising a substantially U-shaped frame having legs extending substantially parallel to one another, a rotor support having arms extending outwardly therefrom in opposite directions with one of said arms positioned adjacent one of said legs and spaced from the other leg and with the other of said arms positioned adjacent the other of said legs and spaced from the first-mentioned leg, a pair of opposing springs at each side of said support mounting said casing for oscillation in said frame and yieldingly opposing precession of the support in either direction from its neutral position, and each of said springs being secured at one end to one of said arms and at the other end to the leg spaced therefrom.

6. An angular rate gyroscope comprising a substantially U-shaped frame having legs extending substantially parallel to one another, a rotor support having arms extending outwardly therefrom in opposite directions with one of said arms positioned adjacent one of said legs and spaced from the other leg and with the other of said arms positioned adjacent the other of said legs and spaced from said first mentioned leg, crossed springs at each side of said support mounting said casing for oscillation in said frame and yieldingly opposing precession of the support in either direction from its neutral position, each of said springs being secured to one of said arms and to the leg spaced therefrom, and said springs being free of engagement with said rotor support at their points of crossing.

7. An angular rate gyroscope having a rotor support, a frame, and pairs of opposing crossed substantially planar springs mounting said support in said frame and opposing precession of said support in both directions from its neutral position, said springs providing the sole connection between said support and said frame.

8. An angular rate gyroscope comprising a rotor support adapted to precess about an axis, a frame, and crossed springs mounting said support in said frame at points spaced from the precession axis and yieldingly opposing precession of the support in either direction from its neutral position.

References Cited in the file of this patent

UNITED STATES PATENTS

| Number | Name | Date |
| --- | --- | --- |
| 392,617 | Lieb et al. | Nov. 13, 1888 |
| 2,242,253 | Lyman | May 20, 1941 |
| 2,291,612 | Draper | Aug. 4, 1942 |
| 2,303,641 | Horstman | Dec. 1, 1942 |
| 2,484,823 | Hammond, Jr. | Oct. 18, 1949 |
| 2,517,612 | Varian | Aug. 8, 1950 |
| 2,584,125 | Haglund | Feb. 5 1952 |